(12) United States Patent
Pohn et al.

(10) Patent No.: US 10,519,573 B2
(45) Date of Patent: Dec. 31, 2019

(54) ROTOR SPINNING MACHINE WITH A MULTIPLE NUMBER OF WORK STATIONS AND A SUCTION DEVICE

(71) Applicant: Rieter Ingolstadt GmbH, Ingolstadt (DE)

(72) Inventors: Romeo Pohn, Geisenfeld/Rottenegg (DE); Adalbert Stephan, Beilngries/Paulushofen (DE); Gernot Schäffler, Wäschenbeuren (DE); Milan Macko, Ceska Trebova (CZ)

(73) Assignee: Rieter Ingolstadt GmbH, Ingolstadt (DE)

( * ) Notice: Subject to any disclaimer, the term of this patent is extended or adjusted under 35 U.S.C. 154(b) by 259 days.

(21) Appl. No.: 15/538,397

(22) PCT Filed: Dec. 21, 2015

(86) PCT No.: PCT/EP2015/080780
§ 371 (c)(1),
(2) Date: Jun. 21, 2017

(87) PCT Pub. No.: WO2016/102456
PCT Pub. Date: Jun. 30, 2016

(65) Prior Publication Data
US 2017/0342604 A1    Nov. 30, 2017

(30) Foreign Application Priority Data

Dec. 22, 2014   (DE) .................. 10 2014 119 380

(51) Int. Cl.
*D01H 4/14*    (2006.01)
*D01H 4/08*    (2006.01)
(Continued)

(52) U.S. Cl.
CPC ................. *D01H 4/14* (2013.01); *D01H 1/16* (2013.01); *D01H 4/06* (2013.01); *D01H 4/08* (2013.01);
(Continued)

(58) Field of Classification Search
CPC .. D01H 4/14; D01H 4/06; D01H 4/08; D01H 11/005; D01H 1/16
See application file for complete search history.

(56) References Cited

U.S. PATENT DOCUMENTS 3,203,051 A * 8/1965 Whitehurst .............. D01H 5/38
19/239
3,381,458 A * 5/1968 Rajnoha ................... D01H 1/16
57/1 R
(Continued)

FOREIGN PATENT DOCUMENTS

DE    42 19 701 A1    1/1993
DE    196 12 707 A1    10/1997
(Continued)

OTHER PUBLICATIONS

IPRP, Jun. 27, 2017.

*Primary Examiner* — Shaun R Hurley
*Assistant Examiner* — Bao-Thieu L Nguyen
(74) *Attorney, Agent, or Firm* — Dority & Manning, P.A.

(57) ABSTRACT

A rotor spinning machine includes a plurality of work stations arranged side by side between two front-side ends along at least one longitudinal side of the machine. Each work station includes work elements for producing and winding a yarn, such as a feed device, an opening device, a spinning rotor, and a winding device. A suction device provides a negative spinning pressure at the work stations and includes a negative pressure source arranged at each of the two front-side ends of the rotor spinning machine. Each negative pressure source is connected to a separate negative (Continued)

pressure channel that extends in a longitudinal direction of the rotor spinning machine only over a part of a total number of the work stations. Each work station includes an individual drive for the spinning rotor.

17 Claims, 4 Drawing Sheets

(51) Int. Cl.
   *D01H 1/16* (2006.01)
   *D01H 4/06* (2006.01)
   *D01H 11/00* (2006.01)
   *F16C 17/08* (2006.01)
   *F16C 32/04* (2006.01)

(52) U.S. Cl.
   CPC ............ *D01H 11/005* (2013.01); *F16C 17/08* (2013.01); *F16C 32/0442* (2013.01)

(56) References Cited

U.S. PATENT DOCUMENTS

| | | | |
|---|---|---|---|
| 3,774,382 A * | 11/1973 | Bartling | D01H 1/16 57/1 R |
| 3,810,352 A * | 5/1974 | Miyazaki | D01H 4/24 57/263 |
| 3,874,154 A * | 4/1975 | Stahlecker | D01H 1/16 57/407 |
| 3,977,168 A * | 8/1976 | Schewe | D01H 1/16 57/1 R |
| 3,986,328 A * | 10/1976 | Harrap | D01H 4/36 57/301 |
| 3,988,880 A * | 11/1976 | Miyazaki | B65G 47/66 57/281 |
| 4,598,539 A * | 7/1986 | Stahlecker | B65H 51/205 57/263 |
| 4,628,676 A * | 12/1986 | Lepach | B65H 67/04 57/266 |
| 4,628,685 A * | 12/1986 | Stahlecker | D01H 4/52 57/261 |
| 4,638,625 A * | 1/1987 | Lovas | D01H 4/48 57/263 |
| 4,787,198 A * | 11/1988 | Stahlecker | D01H 4/16 57/263 |
| 5,238,713 A * | 8/1993 | Sago | H01L 21/6715 118/320 |
| 5,431,006 A * | 7/1995 | Schuller | D01H 4/08 57/1 R |
| 5,487,263 A * | 1/1996 | Scheufeld | D01H 13/106 57/58.86 |
| 5,515,672 A * | 5/1996 | Koltze | D01H 9/187 57/281 |
| 5,540,043 A | 7/1996 | Raasch | |
| 5,566,540 A * | 10/1996 | Bertrams | D01H 9/187 242/130.3 |
| 5,647,196 A * | 7/1997 | Wassenhoven | D01H 4/36 57/1 R |
| 5,850,730 A | 12/1998 | Wassenhoven et al. | |
| 5,852,844 A * | 12/1998 | Leifeld | D01H 11/005 15/301 |
| 5,934,060 A * | 8/1999 | Schmitz | B65H 54/70 57/304 |
| 6,116,011 A * | 9/2000 | Wassen | D01H 4/36 57/301 |
| 6,124,658 A | 9/2000 | Coenen | |
| 2004/0256053 A1* | 12/2004 | Burpo | B29C 66/721 156/285 |
| 2007/0028585 A1* | 2/2007 | Greckendorfer | D01H 4/50 57/404 |
| 2007/0137167 A1* | 6/2007 | Doerner | B65H 67/068 57/404 |
| 2007/0151924 A1* | 7/2007 | Mir | B01D 61/14 210/637 |
| 2008/0243288 A1* | 10/2008 | Greckendorfer | D01H 4/42 700/109 |
| 2014/0360151 A1* | 12/2014 | Meyer | D01H 1/14 57/308 |
| 2015/0337463 A1* | 11/2015 | Stahlecker | D01H 7/90 57/417 |
| 2015/0361593 A1* | 12/2015 | Burchert | D01H 4/14 57/406 |
| 2016/0010245 A1* | 1/2016 | Stahlecker | D01H 4/40 57/417 |
| 2017/0342604 A1* | 11/2017 | Pohn | D01H 4/08 |
| 2017/0350042 A1* | 12/2017 | Pohn | D01H 4/02 |
| 2017/0362746 A1* | 12/2017 | Stephan | D01H 4/44 |
| 2018/0112334 A1* | 4/2018 | Meier | D01H 4/08 |

FOREIGN PATENT DOCUMENTS

| | | | | |
|---|---|---|---|---|
| DE | 197 55 779 A1 | 6/1999 | | |
| DE | 10017209 A1 * | 10/2001 | ............... | D01H 5/66 |
| DE | 10 2004 016 796 B4 | 10/2005 | | |
| DE | 10 2006 029 056 A1 | 12/2007 | | |
| DE | 10 2007 053 467 A1 | 5/2009 | | |
| GB | 1 342 658 A | 1/1974 | | |
| WO | WO 2008/058606 A1 | 5/2008 | | |

* cited by examiner

ROTOR SPINNING MACHINE WITH A MULTIPLE NUMBER OF WORK STATIONS AND A SUCTION DEVICE

FIELD OF THE INVENTION

The present invention relates to a rotor spinning machine with a multiple number of work stations arranged side by side in the longitudinal direction of the rotor spinning machine on at least one longitudinal side between two front-side ends of the rotor spinning machine. Each work station features a multiple number of work elements for the production and winding of a yarn, whereas the work elements comprise at least one feed device, one severing device, one spinning rotor along with one winding device, and with a suction device for producing a negative spinning pressure at the work stations.

BACKGROUND

In the state of the art of rotor spinning machines, it has long been customary to drive all of the work elements of the work stations centrally, in order to be able to operate the machines cost-effectively. In each case, the drive of the identical work elements is effected by a central drive arranged on one end of the rotor spinning machine, which drives the work elements of all work stations by means of a shaft over the length of the machine or a tangential belt. A device for producing the negative spinning pressure required for yarn production is arranged centrally in a frame at one end of the rotor spinning machine. The negative spinning pressure is distributed from there to all work stations through a negative pressure channel over the length of the machine. Usually, the central drives for the work elements are accommodated in a first end frame of the rotor spinning machine and the device for producing the negative spinning pressure is accommodated in a second frame at the opposite end of the rotor spinning machine.

In order to meet the requirements for an increase in productivity, it was necessary to increase the number of work stations on a rotor spinning machine. However, due to problems caused by elongation and torsion, the described machine concept reaches its limits with a work station that is driven centrally from a machine end. The same applies to the supply of the work stations with negative spinning pressure. As such, various machine concepts that enable an increase in the number of work stations per spinning machine have already been proposed.

Therefore, DE 10 2004 016 796 B4 proposes dividing a rotor spinning machine into two sections and arranging central drives not only in an end-side frame, but also in an intermediate frame arranged between the two sections. Here, the work elements of the first section are driven by a central drive arranged in the end-side frame and the work elements of the second section are driven by a central drive arranged in the intermediate frame. Furthermore, the two sections of the rotor spinning machine are to be separately supplied with negative pressure via two separate lines. The negative pressure source required for this purpose can be arranged in one of the end-side frames or in the intermediate frame.

Moreover, DE 10 2006 029 056 A1 describes a rotor spinning machine with an intermediate frame arranged between the work stations. At the same time, at least the central drive for the thread traversing devices and the device for producing the negative spinning pressure are to be arranged in the intermediate frame. Thereby, both the required length of the thread guide rods along with the required length of the negative pressure channels for the distribution of the negative spinning pressure to the work stations are reduced, since they have to extend only from the intermediate frame to one of the two machine ends.

By means of such an intermediate frame, it is possible to reduce the length of central devices, and to thereby reduce the technical problems caused by elongation and torsion in long machines. However, the accessibility to the components arranged in the intermediate frame, along with the supply and disposal on the machine, can be made more difficult by this arrangement. However, in addition to mastering the technical problems with long machines, it is likewise necessary to be able to operate them in a cost-effective and energy-saving manner.

SUMMARY OF THE INVENTION

Therefore, a task of the present invention is to propose a rotor spinning machine that enables the arrangement of a particularly high number of work stations on the spinning machine, and at the same time permits a cost-effective operation of the machine. Additional objects and advantages of the invention will be set forth in part in the following description, or may be obvious from the description, or may be learned through practice of the invention.

A rotor spinning machine features a multiple number of work stations arranged side by side in the longitudinal direction of the rotor spinning machine between two front-side ends on at least one longitudinal side of the rotor spinning machine. Each of the work stations features a multiple number of work elements for the production and winding of a yarn, whereas such work elements comprise at least one feed device, one severing device, one spinning rotor, and one winding device. Furthermore, the rotor spinning machine features a suction device for producing a negative spinning pressure at the work stations. It is provided that the suction device includes at least two separate negative pressure sources, whereas at least one negative pressure source is arranged on each of the two front-side ends of the rotor spinning machine, and whereas each of the two negative pressure sources is connected to a separate negative pressure channel that extends in the longitudinal direction of the rotor spinning machine only over a part of the work stations. Furthermore, each work station has an individual drive, in particular an individual electric drive, for the spinning rotor.

Given that a negative pressure source is provided at both ends of the rotor spinning machine, which negative pressure source must supply only a part of the work stations, the pressure losses arising over the length of the negative pressure channel can be significantly reduced. It is thereby possible to use negative pressure sources with a lower suction capacity, whereas the total capacity of the two negative pressure sources can also be lower than it would be in the case of a single negative pressure source with a continuous negative pressure channel.

Likewise, through the individual drives for the spinning rotors, losses due to the flexing in a tangential belt over the length of the machine, as it is used in conventional, centrally driven spinning rotors, are avoided. Due to the high rotational speeds of the spinning rotors and the high power that would have to be transmitted by the belt in the case of a central drive, such losses are greater, the more work stations the machine features. Therefore, for a very large number of work stations (for example, over 500 work stations), a significant energy savings is possible through individually driven spinning rotors despite the higher expenditure of an individual drive.

The combination of individually driven spinning rotors, with a subdivided supply of negative pressure, with a negative pressure source at each end of the machine, enables a particularly energy-saving and cost-effective operation, based on the optimal arrangement and drive form of such two components, which are essential for energy consumption. Accessibility to the negative pressure sources or to their filter boxes, in which suctioned contaminants and waste are retained by the work stations, is not adversely affected, due to the arrangement on the front-side ends of the rotor spinning machine. Therefore, maintenance along with supply and disposal by operators (for example) is facilitated, which further contributes to the cost-effective operation of the machine.

According to an advantageous additional embodiment, the work station also features a non-contact bearing, in particular a magnetic bearing, for the spinning rotor. Thereby, the energy- and cost-saving operation of the rotor spinning machine is further supported, since there are no additional losses due to flexing action, as they arise in conventional support disk bearings.

It is also advantageous if each of the negative pressure sources is arranged in a frame arranged on the front-side ends of the rotor spinning machine. It is thereby possible to accommodate central drives of the rotor spinning machine and the negative pressure source in one common frame. However, it is also conceivable to arrange the negative pressure sources in a separate housing or frame.

Furthermore, it is advantageous if each of the negative pressure sources has a fan and a drive for the fan. Herein, the drives of the negative pressure sources are preferably controllable by a central control device of the rotor spinning machine. This may comprise at least two identical drives and fans. However, if a different level of negative pressure is required in the at least two negative pressure channels, for example in the case of different spinning applications, or if the negative pressure channels are of varying length, different fans and drives can also be used. Herein, it is also advantageous that a separate filter box is assigned to each of the fans, so that the collected waste can be disposed of at both ends of the machine.

Furthermore, for an energy-saving operation of the rotor spinning machine, it is advantageous if at least 20%, preferably at least 30%, more preferably at least 40%, of the work stations arranged side by side in the longitudinal direction of the rotor spinning machine are connected on at least one longitudinal side on each of the at least two negative pressure channels. This ensures that the pressure losses in the negative pressure channels are kept within narrow limits.

It is also advantageous if the two negative pressure channels are of the same length and/or if the same number of work stations are connected to the two negative pressure channels. Compared to a single, negative pressure channel over the length of the machine, the negative pressure channels can be reduced to approximately half of the previous length, by which pressure losses can be reduced in an optimum manner.

According to a structurally advantageous and space-saving design of the rotor spinning machine, it is provided that the at least two negative pressure channels are arranged in an aligned manner one behind the other in the longitudinal direction of the rotor spinning machine. It is thereby also possible to adopt the previous machine configuration with a single, continuous negative pressure channel, and to use only a partition or a shutter for flexible subdivision, in order to form the two separate negative pressure channels. Alternatively, however, it is also conceivable for the two negative pressure channels to run at least partially parallel to each other with respect to the longitudinal direction of the rotor spinning machine. This makes it possible to connect individual work stations to one or the other negative pressure channel, as needed, and thereby to flexibly design the supply of negative pressure.

Likewise, it is advantageous if, in the operation of the rotor spinning machine, negative pressure of at least 60 mbar is achieved in each of the negative pressure channels at one end of the respective negative pressure channel opposite to the negative pressure source. Thereby, the supply of the work stations with a largely uniform level of negative pressure can be ensured.

Furthermore, it is advantageous if each work station features an individual drive, in particular an individual electric drive, for the feed device. Thereby, it is possible in a particularly advantageous manner to adjust the feed rate of the fibers to the prevailing conditions at the work station. In particular when spinning in and producing certain fancy yarns, advantages can be obtained with individually drivable feed devices.

If, with the rotor spinning machine, work stations are arranged on both longitudinal sides between the front-side ends, it can be advantageous if each of the two longitudinal sides is likewise separately supplied with negative pressure. Thus, two negative pressure sources are provided at each of the two ends, each of which is connected to a separate negative pressure channel, which in turn extends only over a part of the work stations arranged side by side in the longitudinal direction.

According to a first advantageous additional form of the invention, it is further provided that the additional work elements of the work stations, at least the severing devices and the winding devices, are driven by means of an individual drive. The spinning machine is thereby particularly flexible and allows the production of different products and a flying batch change. In particular, if the work stations also have their own thread handling elements, long waiting times for the maintenance or repair of thread breakages can also be avoided, which in turn increases productivity.

According to an additional form of the invention, on the other hand, the additional work elements, but at least the severing devices and the winding devices, of a longitudinal side are each driven by means of central drives. Since, compared to the spinning rotors, these revolve with smaller rotational speeds, even with longer machines with a particularly high number of spinning units, for example, more than 500 spinning units, the losses are still in a range in which a central drive proves to be cost-effective.

Furthermore, it is advantageous if identical, centrally driven work elements of a longitudinal side each form at least two groups, whereas a separate central drive for driving one of the two groups is arranged in each of the two frames on the front-side ends. Thereby, a shortening of the drive means, which is typically over the length of the machine, of up to half of the otherwise required length can in turn be achieved. As a result, not only can problems caused by torsion and elongation be reduced; rather, the losses due to flexing action in the belt can also be reduced. At this, each of the at least two groups per longitudinal side of the rotor spinning machine may comprise the same number of work stations or even different numbers. It is advantageous if, in turn, at least 20% of all work stations on one longitudinal side is assigned to a central drive in each case.

It is also advantageous if the rotor spinning machine features at least two package conveyor belts arranged one behind the other in the longitudinal direction of the rotor spinning machine. This also results in high losses, which can be reduced by using two shorter belts with smaller drives in place of one single belt with a large drive.

Likewise, it is advantageous if the rotor spinning machine features an intermediate storage unit for empty sleeves, in order to shorten the delivery paths and thus also the belt running times for supplying empty sleeves.

According to an additional form of the invention, it can be advantageous if the rotor spinning machine features an intermediate frame between the two end-side frames. Deflection rollers of central drives and/or drives and/or storage units for central supply and disposal devices can be arranged therein.

The supply of empty sleeves can be further facilitated and the delivery times for empty sleeves can be shortened if the rotor spinning machine features a central sleeve storage unit for empty sleeves at each of its front-side ends. Preferably, these are arranged at a distance from the two frames, in order to allow access to the frames.

Furthermore, it is advantageous if the rotor spinning machine features, at each of its two front-side ends, a connection for the feed of energy, in particular for a power supply for the electric components and/or for a compressed air supply.

It is likewise advantageous if the rotor spinning machine features an exhaust air outlet of the suction device at each of its two front-side ends. A protective discharge can also be provided at the two ends of the machine.

BRIEF DESCRIPTION OF THE DRAWINGS

Additional advantages of the invention are described on the basis of the following presented embodiments. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
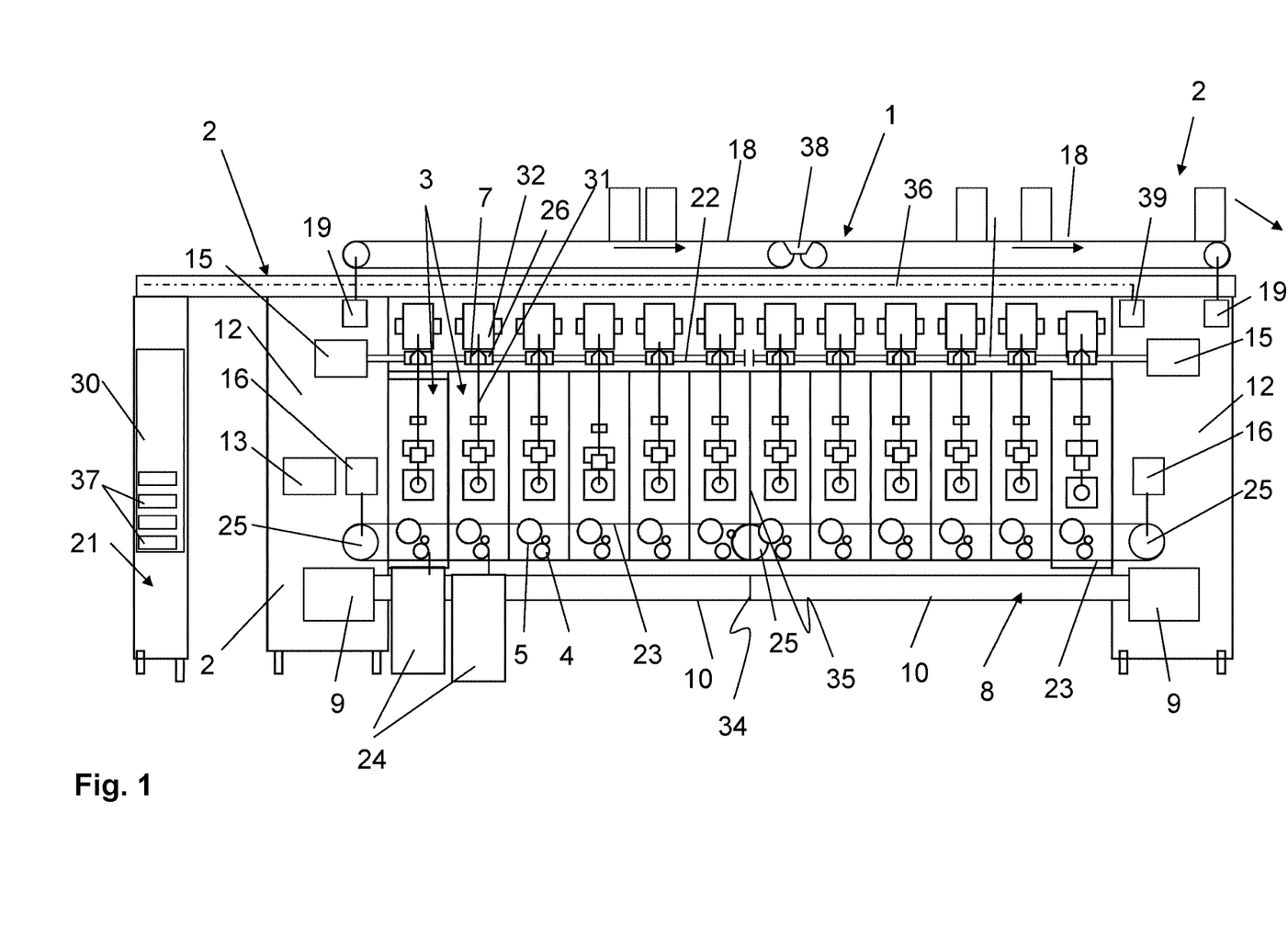
FIG. 1 is a rotor spinning machine in a schematic top view in accordance with a first design.

FIG. 1 shows a schematic view of a rotor spinning machine 1, which is particularly suitable for arranging a multiple number of work stations 3 side by side in the longitudinal direction of the rotor spinning machine 1. The rotor spinning machine 1 features a multiple number of work stations 3 arranged side by side between two front-side ends 2, each of which work stations features a multiple number of work elements 4, 5, 6, 7 for the production and winding of a yarn 31 in a manner known per se. Each work station 3 features a feed device 4, by means of which fiber material is fed from a storage hopper 24 into an opening device 5. This feeds the fiber material opened into individual fibers to a spinning rotor 6, in which it is spun into yarn 31 and finally wound onto a coil 32 by means of a winding device 7.

Figure 2:
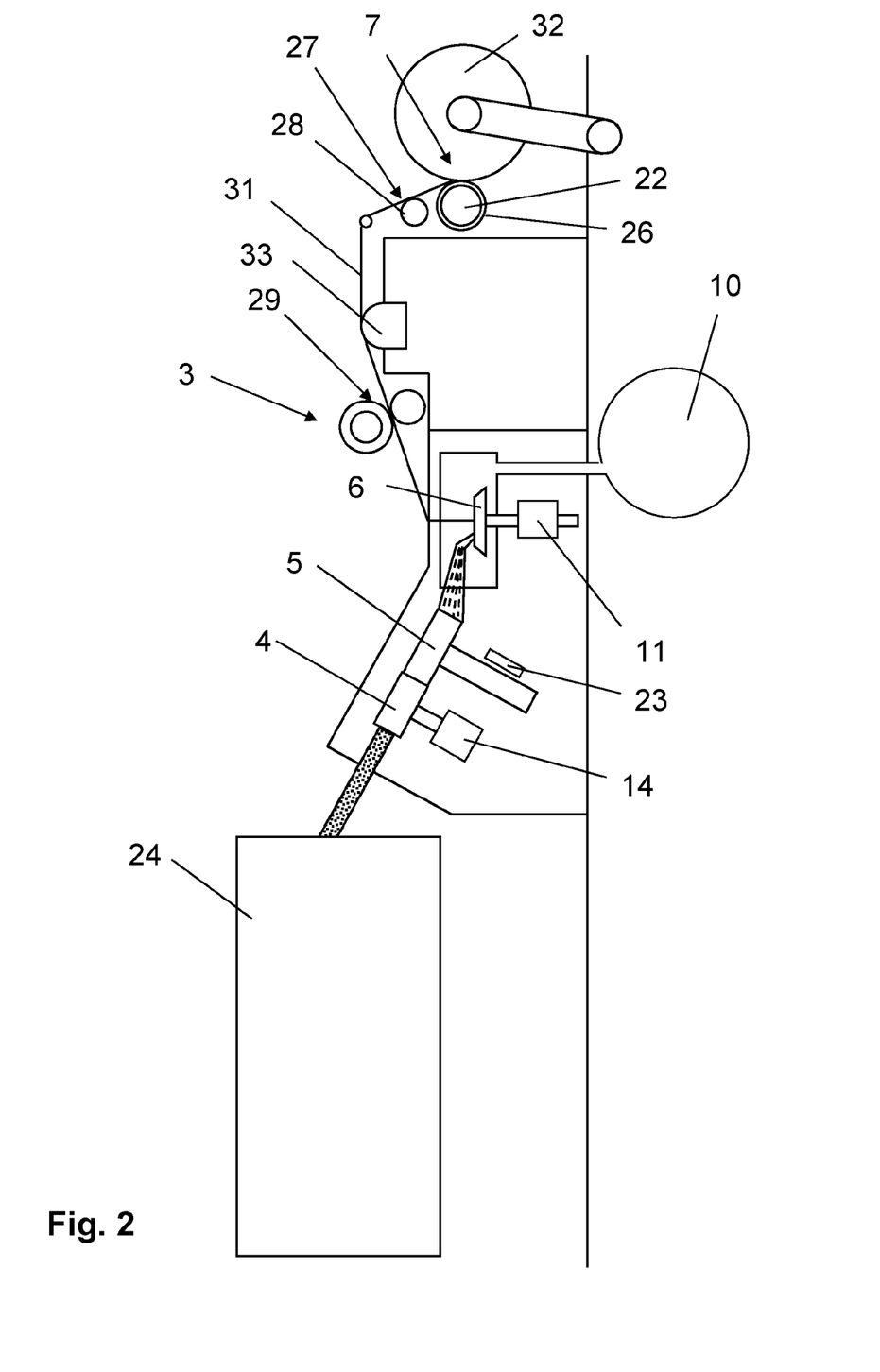
FIG. 2 is a work station of a rotor spinning machine in a schematic sectional view.

The work elements 4, 5, 6, 7 are shown in more detail in a schematic sectional view of a work station 3 in FIG. 2. According to FIG. 2, a draw-off device 29, a waxing device 33, and a traversing device 27 with a thread guide rod 28 are also shown. Furthermore, a negative pressure channel 10 is shown, which serves to supply the work stations 3 with negative spinning pressure, and is also provided for the removal of contaminants and waste from the work stations 3, which arise during spinning along with the maintenance of the work stations 3.

In order to meet market demands for an increase in the productivity of rotor spinning machines 1, it is necessary to increase the number of work stations 3 per rotor spinning machine 1. This calls into question conventional machine concepts, in which the work elements 4, 5, 6, 7 of a work station 3 are each driven centrally from an end-side frame 2. In addition, there are considerable requirements for keeping the operating costs for such rotor spinning machines 1 within limits, even when the machine is extended.

Therefore, for the supply of negative pressure, the rotor spinning machine 1 shown with the present invention features a suction device 8 with at least two separate negative pressure sources 9, each of which is arranged on the two front-side ends 2 of the rotor spinning machine 1 in the one-sided frames 12. Each of the negative pressure sources 9 is connected to a separate negative pressure channel 10. Each of the separate negative pressure channels 10 extends in the longitudinal direction of the rotor spinning machine 1 only over a part of the work stations 3. With the present invention, the negative pressure channels 10 are arranged in an aligned manner one behind the other in the longitudinal direction of the rotor spinning machine 1, such that only a small installation space is required. Here, it is particularly advantageous that a division 34 between the two negative pressure channels 10 may also take place in a flexible manner by means of a displaceable shutter in a continuous channel 10. In each case, each work station 3 is connected to at least one of the two negative pressure channels 10, whereas, on the other hand, only part of the work stations 3 is connected to each of the negative pressure channels 10. Furthermore, a central control device 13 is arranged in one of the frames 12, by means of which, not only the drives of the negative pressure source 9, but also all other central drives 15, 16 and belt drives 19, 39 (see FIG. 3), can be controlled.

By means of such a distributed supply of negative pressure with at least two shorter negative pressure channels 10, the total losses relative to the rotor spinning machine 1 can be substantially reduced, compared to a single central negative pressure source 9. The energy-saving operation of the rotor spinning machine 1 is further assisted by the fact that the spinning rotors 6 of each work station 3 are driven by means of an individual drive 11 (see FIG. 2). Due to the high rotational speed of the spinning rotors 6, in the case of a central drive by means of a belt, substantial power losses due to the flexing action would be expected. In both cases, the losses increase disproportionately as the length of the machine increases, such that the described machine concept, with individually driven spinning rotors 6 and a distributed supply of negative pressure, proves to be an energetically optimal combination. For example, on a rotor spinning machine 1 with up to 600 work stations 3, up to 20% in energy savings can be achieved compared to a conventional concept with a single, central negative pressure source 9 and a central rotor drive.

For an energy-saving operation of the rotor spinning machine 1, according to FIG. 2, it is also provided that the individually driven spinning rotor 6 is mounted in a non-contact bearing (not shown). Given the flexing action in the support disks of conventional bearings, substantial energy savings can be achieved, in particular, for a very large number of work stations 3 per rotor spinning machine 1.

For the drive of the other work elements, in particular of the feed device 4, of the opening device 5, and of the winding device 7, it may be advantageous to drive them by means of central drives 15, 16. According to the presentation of FIG. 2, for example, the severing device 5 of each work station 3 is driven centrally or in a group-by-group manner by means of a tangential belt 23. Likewise, the winding devices 7 are centrally driven, at least in a group-by-group manner, by means of a winding roller shaft 22, which drives the coil 32 via a winding roller 26. In the same manner, a feed device 4 of the work stations 3 can also be centrally driven, at least in a group-by-group manner. According to FIG. 2, however, the feed device 4 also has an individual drive 14. However, by way of derogation from the views shown in the figures, it is also possible to drive the other work elements of a work station 3, in each case by means of individual drives.

Figure 3:
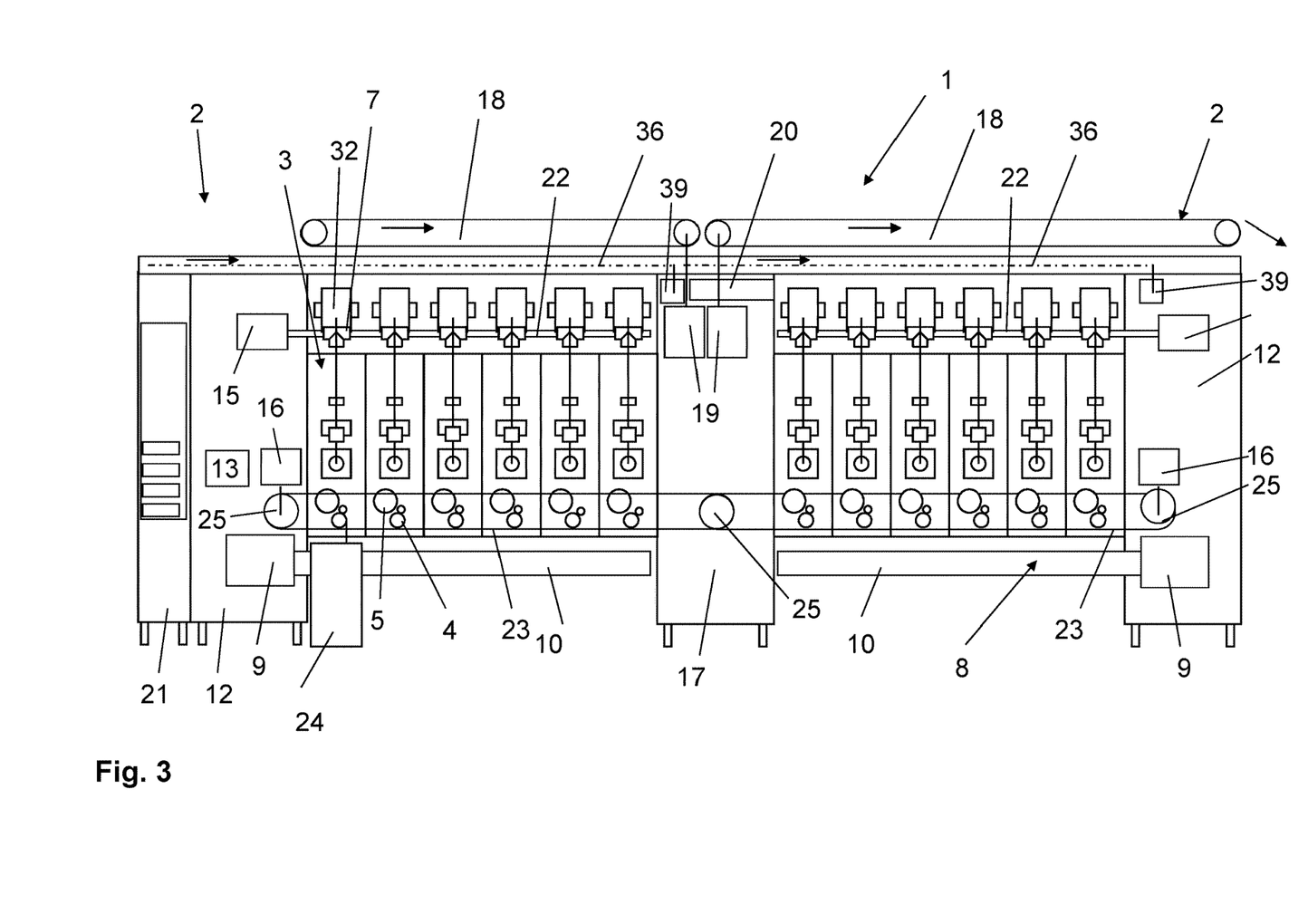
FIG. 3 is a rotor spinning machine in a schematic top view in an alternative design.

According to FIGS. 1 and 3, the remaining work elements 4, 5, 7 are centrally driven in a group-by-group manner. With the present invention, the work stations 3 of a longitudinal side of the rotor spinning machine 1 are subdivided into two groups, whereas each of the two groups is assigned with a separate central drive 15 for the winding roller shaft 22 along with a separate central drive 16 for a tangential belt 23 of the opening devices 5. Herein, the central drives 15, 16 are also accommodated in the frames 12 arranged at the front-side ends 2. Deflection rollers 25 of the tangential belts 23 are arranged in the end-side frames 12 and in the area of the work stations 3. Here, it is conceivable to make the division 35 of the work stations 3 in the area of the central deflection rollers 25 so wide that they can be accommodated therein. Here, the tangential belt 23 of each central drive 16, just like each winding roller shaft 22, extends only over a part of the work stations 3 arranged side by side in the longitudinal direction. The drives of the feed devices 4, which can also be driven in a group-by-group manner by means of central drives, are not shown in FIGS. 1 and 3. Moreover, such a central drive arranged in a group-by-group manner is advantageous for the traversing devices 27 and draw-off devices 29 not shown in FIGS. 1 and 3, while waxing devices 33 that may be present can also be driven centrally over the entire length of the rotor spinning machine 1.

With the present invention, only one longitudinal side of a rotor spinning machine 1 is shown. It is understood that the rotor spinning machine 1 may feature a multiple number of work stations 3 on its two longitudinal sides. In this case, the described arrangement of the drives 15, 16 is also provided in an analogous manner on the opposite longitudinal side of the rotor spinning machine 1. If, as with the present invention, the work stations 3 of each longitudinal side are subdivided into two groups, a total of four central drives 15, 16, each of which is arranged at each of the two front-side ends, accordingly arise for the identical work elements 4, 5, 7. At this, it may also be advantageous to provide the two longitudinal sides of the rotor spinning machine 1 with negative pressure, in each case separately from one another. In this case, two separate negative pressure channels 10, which are each assigned to one of the two longitudinal sides of the rotor spinning machine 1, would be arranged on each of the two front-side ends 2.

FIG. 3 shows a design of a rotor spinning machine 1 with an intermediate frame 17. This can be advantageous if the rotor spinning machine 1 has a very large number of work stations 3 of 600 and more. The rotor spinning machine 1 largely corresponds to that already described with reference to FIGS. 1 and 2, such that only the differences from the design of FIG. 1 will be discussed in the following. In the simplest case, the intermediate frame 17 can only be provided for accommodating deflection rollers 25, which are required in the case of work elements that are driven centrally by means of tangential belts 23. However, according to the design shown with the present invention, the drives 19 of the package transport belts 18 are also arranged in the center frame 17.

An additional problem with the equipping of a rotor spinning machine 1 with a very large number of work stations 3 is the disposal of the completely wound coils 32 along with the supply of the work stations 3 with empty sleeves 37. If the disposal of the coils 32 takes place by means of a package conveyor belt 18, considerable friction losses arise in the guide plates (not shown) of the rotor spinning machine 1.

Therefore, in the embodiment of FIG. 1, two package transport belts 18 are provided one behind the other in the longitudinal direction. Herein, each of the two package transport belts 18 is provided with its own drive 19, which in each case is in turn arranged at the ends 2 of the rotor spinning machine 1, preferably in the frames 12. Given the fact that the package transport belts 18 in turn extend only over a part of the work stations 3 arranged side by side in the longitudinal direction, the two drives 19 can be designed to be substantially smaller and can therefore be designed to be fuel-efficient. With the present invention, a design with which both package transport belts 18 are arranged in the same direction is shown. Thus, all of the coils are disposed of at only one end 2 of the rotor spinning machine 1.

The removal of the coils 32 can take place in various ways. For example, a coil lift (not shown), by means of which one or more coils are brought from the conveyor belt 18 to a convenient removal height and are removed there by an operator, can be provided. However, it is also conceivable for the coils 32 to be removed continuously from the end of the rotor spinning machine 1 by an automatic removal device (not shown) and supplied for further use.

With the present invention, a transfer device 38, for example a roller track, is arranged at the transfer point between the two package transport belts 18, by means of which the coils 32 can be transferred from the first to the second package conveyor belt 18.

A central supply device 21 is provided for supplying the work stations 3 with empty sleeves 37. This includes a central storage unit 30 for empty sleeves 37 along with a transport device, for example a sleeve transport belt 37, which is solely illustrated by a dotted line. This has a drive 39 in one of the two frames 12, and, with the present invention, extends over all work stations 3 of a longitudinal side of the rotor spinning machine 1.

In the embodiment of FIG. 3, two package transport belts 18 are also provided one behind the other in the longitudinal direction. With this design, the drives 19 of the package transport belts 18 are advantageously arranged in the intermediate frame 17. This makes it possible to accommodate other devices, such as intermediate storage devices for empty sleeves (see FIG. 4), at the ends 2 or in the frames 12, instead of the drives 19 of the package transport belts 18.

With the present invention, in the area of the intermediate frame 17, an intermediate storage unit 20, in which a smaller number of empty sleeves 37 can be stored, is provided. Thus, it is possible to supply the work stations 3, which are located farther away from the central sleeve storage unit 30, from the intermediate storage unit 20, and the work stations located near the central sleeve storage unit 30, from the central sleeve storage unit 30. For this purpose, the intermediate storage unit 20 has a removal device, in order to take the empty sleeves 37 back to the sleeve conveyor belt 36. Herein, it is advantageous that only a single sleeve transport belt 36 is required. By means of such sleeve transport belt 36, empty sleeves 37 are fed both from the central sleeve storage unit 30 to the individual work stations 3 and to the intermediate storage unit 20. If the rotor spinning machine 1 is designed as a double-sided machine, it is expedient to provide a separate sleeve transport belt 36 for each longitudinal side of the rotor spinning machine 1.

Figure 4:
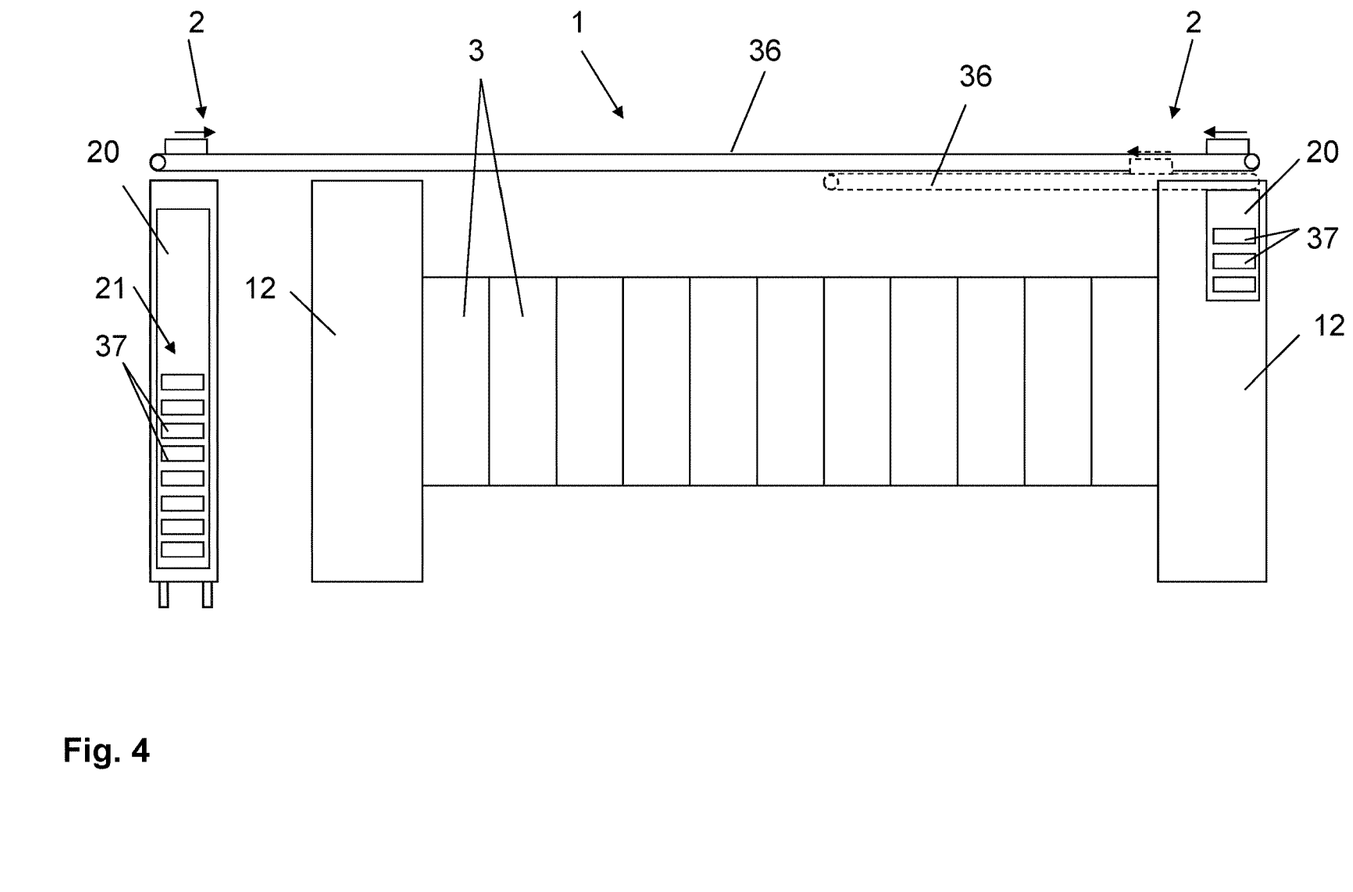
FIG. 4 is a schematic view of a rotor spinning machine with a central supply device for empty sleeves.

FIG. 4 shows an additional embodiment of a device 21 for the supply of sleeves, with which an intermediate storage unit 20 for empty sleeves 37 is arranged in the area of one of the two frames 12. This can be fed with empty sleeves 37 by means of the sleeve transport belt 36 from the central sleeve storage unit 30. The work stations 3, which are located near the central sleeve storage unit 30, are supplied in the usual manner from the central sleeve storage unit 30, while, for supplying the work stations 3 arranged at the opposite end 2, the empty sleeves 37 are transported from the buffer storage unit 20 in the opposite direction to the respective work stations 3. For this purpose, the sleeve transport belt 36 can be driven in changing conveying directions (see arrows). As indicated by dashed lines, a second sleeve conveyor belt 36 arranged above or adjacent to the first can, of course, also be provided, in order to transport the empty sleeves 37 from the intermediate storage unit 20 back to the work station 3. Thereby, the productivity of the rotor spinning machine 1 can be further increased, since the waiting times for empty sleeves 37 can be considerably reduced. Here as well, in the case of a design as a double-sided machine, sleeve transport belts 36 are preferably provided on each longitudinal side of the rotor spinning machine 1.

The invention is not limited to the illustrated embodiments. Thus, by way of derogation from the view shown in FIGS. 1 and 3, it is not absolutely necessary to divide the work stations 3 of a longitudinal side of the rotor spinning machine 1 into equally sized groups. It is also conceivable to provide a larger group and a smaller group on each longitudinal side of the rotor spinning machine 1. Thus, each of the groups forms its own production group, which is assigned with its own central drives 15, 16 and its own negative pressure source 9, such that, in each of the production groups, a different product can also be produced independently of the others. The flexibility of the rotor spinning machine 1 is thereby increased. However, in each case, through the division into two groups on a longitudinal side of the rotor spinning machine 1 by the respectively separate negative pressure source 9, it is ensured that sufficient negative pressure is achieved in each of the negative pressure channels 10 during operation. However, the supply of negative pressure arranged in a group-by-group manner also offers the possibility of variably adjusting the level of negative pressure in the negative pressure channels 10 in accordance with the intended product or in accordance with the application provided in the respective production groups. If, furthermore, a central supply device 21 for empty sleeves 37 with at least one central sleeve storage unit 30 is provided at each of the two ends 2 of the rotor spinning machine 1, the production groups can also be supplied with empty sleeves independently of one another, which improves flexibility in the case of multi-batch application and further reduces waiting times for empty sleeves 37. In this case, the removal of coils at both ends 2 of the rotor spinning machine 1 is also advantageous, if applicable also separately for each of the two longitudinal sides.

Furthermore, with regard to the coil disposal, it is also conceivable to drive the package transport belts 18 in different directions, and dispose of the coils 32 at both ends 2 of the rotor spinning machine 1. Likewise, two sleeve transport belts 36 can also be arranged one behind the other on each longitudinal side of the rotor spinning machine 1. If an intermediate frame 17 is provided, the drives of the sleeve transport belts 36 can, of course, also be arranged therein.

Additional variations and combinations within the framework of the claims also fall under the invention.

LIST OF REFERENCE SIGNS

1 Rotor spinning machine
2 Front-side end of the rotor spinning machine
3 Work station
4 Feed device
5 Severing device
6 Spinning rotor
7 Winding device
8 Suction device
9 Negative pressure source
10 Negative pressure channel
11 Individual drive for spinning rotor
12 Frame
13 Central control device
14 Individual drive for the feed device
15 Central drive for the winding device
16 Central drive for the severing device
17 Intermediate frame
18 Package conveyor belt
19 Drive of the package conveyor belt
20 Intermediate storage unit for empty sleeves
21 Central supply device for empty sleeves
22 Winding roller shaft
23 Tangential belt for the severing roller drive
24 Storage hopper
25 Deflection rollers
26 Winding roller
27 Traversing device
28 Thread guide rod
29 Draw-off device
30 Central sleeve storage unit
31 Yarn
32 Coil
33 Waxing device
34 Division of negative pressure channels
35 Division of the work stations
36 Sleeve conveyor belt
37 Empty sleeves
38 Transfer device
39 Drive of the sleeve conveyor belt

The invention claimed is:

1. A rotor spinning machine, comprising:
   a plurality of work stations arranged side by side between two front-side ends along at least one longitudinal side of the rotor spinning machine;
   each of the work stations comprising work elements for production and winding of a yarn in a spinning process, the work elements comprising a feed device, an opening device, a spinning rotor, and a winding device;
   a suction device that provides a negative spinning pressure at the work stations, the suction device comprising at least two separate negative pressure sources, wherein one of the negative pressure sources is arranged at each of the two front-side ends of the rotor spinning machine;
   each negative pressure source connected to a separate negative pressure channel that extends in a longitudinal direction of the rotor spinning machine only over a part of a total number of the work stations;
   each work station comprising a rotor housing connected to at least one of the separate negative pressure channels to provide negative pressure for the spinning process; and
   each work station comprising an individual drive for the spinning rotor.

2. The rotor spinning machine according claim 1, wherein each work station further comprises a non-contact bearing for the spinning rotor.

3. The rotor spinning machine according to claim 1, wherein each of the negative pressure sources is arranged in a frame at the front-side ends.

4. The rotor spinning machine according to claim 1, wherein each of the negative pressure sources comprises a fan and a drive for the fan, the drives controllable by a central control device of the rotor spinning machine.

5. The rotor spinning machine according to claim 1, wherein at least 20% of the work stations along the longitudinal side of the rotor spinning machine are connected to each the two negative pressure channels.

6. The rotor spinning machine according to claim 1, wherein the two separate negative pressure channels are aligned in the longitudinal direction of the rotor spinning machine.

7. The rotor spinning machine according to claim 1, wherein during operation of the rotor spinning machine, a negative pressure of at least 60 mbar is achieved at an end of each of the negative pressure channels opposite to the negative pressure source associated with the negative pressure channel.

8. The rotor spinning machine according to claim 1, wherein each work station further comprises an individual drive for the feed device.

9. The rotor spinning machine according to claim 1, wherein a plurality of the work stations are arranged in the longitudinal direction of the rotor spinning machine along each longitudinal side of the rotor spinning machine.

10. The rotor spinning machine according to claim 1, wherein each work station further comprises an individual drive for each of the opening device and the winding device.

11. The rotor spinning machine according to claim 1, further comprising any one or combination of:
    all of the opening devices of the work stations along the longitudinal side are driven by a respective central drive;
    all of the winding devices of the work stations along the longitudinal side or the rotor spinning machine are driven by a respective central drive;
    all of opening devices of the work stations alone the longitudinal side are subdivided into at least two groups, each of the groups driven by a respective central drive; or
    all of winding devices of the work stations alone the longitudinal side are subdivided into at least two groups, each of the groups driven by a respective central drive.

12. The rotor spinning machine according to claim 11, wherein at least one of the central drives is arranged in a frame at each of the two front-side ends.

13. The rotor spinning machine according to claim 1, further comprising at least two package conveyor belts arranged one behind the other in the longitudinal direction of the rotor spinning machine.

14. The rotor spinning machine according to claim 1, further comprising an intermediate storage unit for empty sleeves.

15. The rotor spinning machine according to claim 1, further comprising an intermediate frame arranged between the two front-side ends, wherein any one or combination of the following are arranged in the intermediate frame: central drive deflection rollers; drives; or storage units for central supply and disposal devices.

16. The rotor spinning machine according to claim 1, further comprising a central sleeve storage unit for empty sleeves at each of the front-side.

17. The rotor spinning machine according to claim 1, further comprising a connection for energy or an exhaust air outlet at each of the two front-side ends.

* * * * *